(12) United States Patent
Sankaran et al.

(10) Patent No.: US 11,275,577 B2
(45) Date of Patent: Mar. 15, 2022

(54) BREWER UPDATE DEVICE AND METHOD (71) Applicant: BUNN-O-MATIC CORPORATION, Springfield, IL (US)

(72) Inventors: Prashanth Sankaran, Springfield, IL (US); Joshua T. Craig, Springfield, IL (US); Barry O'Dell, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 16/933,047

(22) Filed: Jul. 20, 2020

(65) Prior Publication Data

US 2021/0049004 A1 Feb. 18, 2021

Related U.S. Application Data (60) Provisional application No. 62/886,198, filed on Aug. 13, 2019.

(51) Int. Cl.
*G06F 8/65* (2018.01)
*H04L 29/08* (2006.01)
*A47J 31/52* (2006.01)
*G16Y 20/20* (2020.01)
*G16Y 40/30* (2020.01)
*H04L 67/00* (2022.01)

(52) U.S. Cl.
CPC .............. *G06F 8/66* (2013.01); *A47J 31/521* (2018.08); *G16Y 20/20* (2020.01); *G16Y 40/30* (2020.01); *H04L 67/34* (2013.01)

(58) Field of Classification Search
CPC .......... G06F 8/66; A47J 31/521; G16Y 40/30; G16Y 20/20; H04L 67/34
See application file for complete search history.

(56) References Cited

U.S. PATENT DOCUMENTS

| | | | | |
|---|---|---|---|---|
| 5,515,525 A | * | 5/1996 | Grynberg | G06F 9/45537 703/27 |
| 9,177,122 B1 | * | 11/2015 | Trier | G06F 8/65 |
| 9,860,356 B2 | | 1/2018 | Ripp | |
| 2003/0070555 A1 | * | 4/2003 | Reyhanloo | A47J 31/521 99/282 |
| 2010/0011404 A1 | | 1/2010 | Douillet et al. | |

(Continued)

FOREIGN PATENT DOCUMENTS

| | | |
|---|---|---|
| CN | 105373394 | 3/2016 |
| EP | 3264386 | 1/2018 |

OTHER PUBLICATIONS

Wilbur Curtis, User Guide—G4 Gemini® Series Coffee Brewing System, publicly available prior to Jul. 20, 2020.

*Primary Examiner* — Phillip H Nguyen
(74) *Attorney, Agent, or Firm* — Barnes & Thornburg LLP (57) ABSTRACT An update device for providing configuration updates, such as recipes, advertising content, software update(s), pricing updates and/or other changes to brewer parameters, to a brewer device. When turned on, the update device wirelessly connects to a cloud account associated with the brewer device. Any pending content updates associated with the cloud account are wirelessly delivered to the update device and stored. When the update device is connected to the brewer device, the update device emulates a disk drive to transfer the updates to the brewer device.

26 Claims, 3 Drawing Sheets (56) References Cited

U.S. PATENT DOCUMENTS

| | | | |
|---|---|---|---|
| 2011/0188684 A1* | 8/2011 | Spieler | G06F 8/65 |
| | | | 381/315 |
| 2015/0201796 A1* | 7/2015 | Kuempel | H04L 67/10 |
| | | | 426/231 |
| 2016/0272927 A1* | 9/2016 | Mitchell | C12C 7/205 |
| 2017/0360250 A1* | 12/2017 | Spencer | A47J 31/56 |
| 2020/0184803 A1 | 6/2020 | Holzinger et al. | |

* cited by examiner

BREWER UPDATE DEVICE AND METHOD

RELATED APPLICATIONS

This application claims the benefit of U.S. Provisional Application Ser. No. 62/886,198, filed Aug. 13, 2019, which is hereby incorporated by reference in its entirety.

TECHNICAL FIELD

This disclosure relates generally to brewer devices for making coffee, tea and the like, and particularly to a device for updating software and other content of the brewer device.

BACKGROUND

Many existing brewer devices include communication ports, such as USB ports, through which a software update and/or configuration changes can be made to the brewer. For example, the brewer can be updated by plugging a USB thumb drive loaded with update content into the brewer's USB port and initiate an update. While such configuration changes and/or software updates can extend the brewer's functionality and lifespan, the update process can be time consuming and error prone in some cases.

Technicians, sales associates, field engineers and customers have to deliver and manage physical thumb drives to access files or contents that may be needed for provisioning software updates and configuration changes to brewer devices. Currently, these updates are sent via email or through a file exchange system for which accounts and account setup can be a hurdle. The download of the update content can be dependent on the user's browser, and introduce difficulty in the update process if the browser is incompatible. Likewise, transferring the update to a USB thumb drive can be error prone because the files may not be structured properly or could be stored in an improper format. If the transfer is done incorrectly, many times due to lack of proper instructions, this introduces potential failures in the update process. These issues can make the whole update process extremely frustrating for users and eventually lead to a bad customer experience. Therefore, there is a need for a device that provides a secure and failure proof mechanism for delivering update content to brewer devices.

SUMMARY

According to one aspect, this disclosure provides a brewer update device for updating one or more configuration parameters of a brewer device. The brewer update device includes a portal search manager, a content delivery manager, and an update manager. The portal search manager is to establish a wireless connection with a cloud account associated with one or more pending updates for a brewer device. The content delivery manager is to wirelessly retrieve and store the one or more pending updates to a data storage device. The update manager is to emulate a disk drive and transfer the one or more pending updates to the brewer device.

According to another aspect, this disclosure provides a universal serial bus (USB) drive for changing one or more parameters of a brewer device. The USB drive comprises: a processor; a USB interface circuit coupled to the processor; a wireless communication circuit coupled to the processor; and a memory coupled to the processor and having stored therein a plurality of instructions that, when executed, cause the USB drive to: establish, using the wireless communication circuit, a wireless connection to a cloud account through which one or more configuration changes to a brewer device can be entered; search, using the wireless connection, for any pending updates associated with the cloud account; retrieve, using the wireless connection, one or more pending updates associated with the cloud account; store the one or more updates associated with the cloud account to the memory; emulate a disk drive in response to detecting initiation of an update process; and transfer, using the USB interface circuit, the one or more updates associated with the cloud account to a brewer device.

According to a further aspect, this disclosure provides one or more non-transitory, computer-readable storage media comprising a plurality of instructions stored thereon that, in response to being executed, cause a computing device to: establish a wireless connection to a cloud account through which one or more configuration changes to a brewer device can be entered; search, using the wireless connection, for any pending updates associated with the cloud account; retrieve, using the wireless connection, one or more pending updates associated with the cloud account; store the one or more updates associated with the cloud account to a data storage device; emulate a disk drive in response to detecting initiation of an update process; and transfer the one or more updates associated with the cloud account to a brewer device.

According to yet another aspect, this disclosure provides a remote server to configure one or more parameters of a brewer device. The remote server comprising: a processor; and a memory coupled to the processor and having stored therein a plurality of instructions that, when executed, cause the remote server to: receive credentials for an account of a user; present one or more content configuration options for updating one or more parameters of one or more brewer devices associated with the account of the user; receive one or more user-selected configuration options for the one or more brewer devices associated with the associated of the user; store the one or more user-selected configuration options based on the account of the user; and flag the account of the user as having one or more pending updates.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
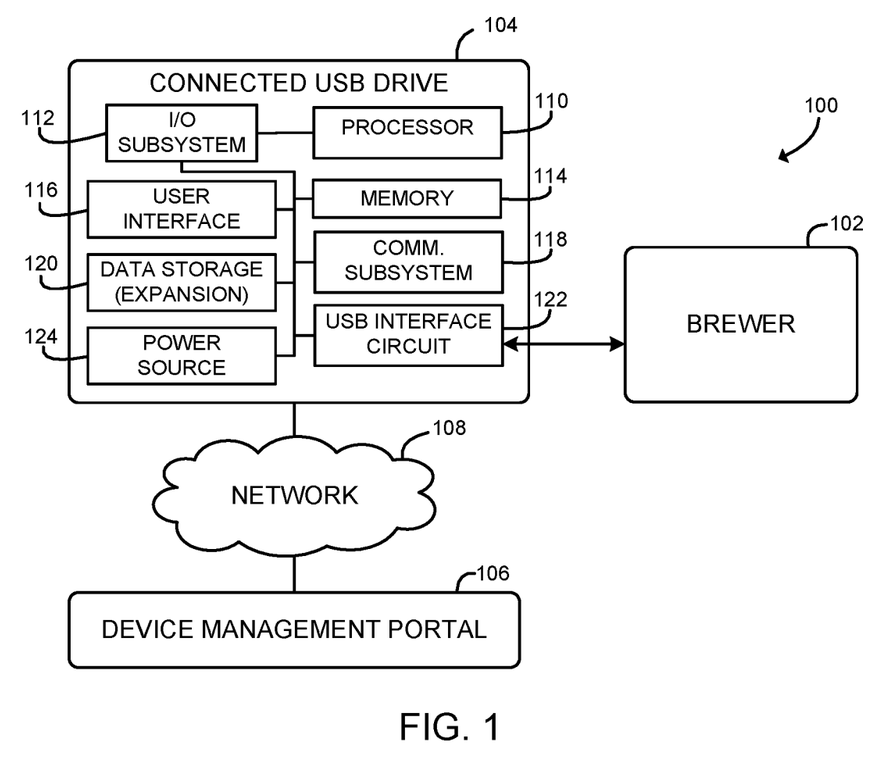
FIG. 1 is a simplified block diagram of at least one embodiment of a system for updating a brewer device.

Referring now to FIG. 1, a system 100 for updating a brewer device 102 includes a brewer update device, which could be embodied as a connected USB drive 104, and a device management portal 106 in communication over a network 108. In use, as described further below, a user may log into a cloud account from the device management portal 106 to select configuration updates, such as recipes, advertising content, software update(s), pricing updates and/or other brewer parameters. The connected USB drive 104, when turned on, wirelessly connects to the cloud account via the network 108. Any pending content updates associated with the cloud account are wirelessly delivered to the connected USB drive 104 and stored. The connected USB drive 104 may then be connected to the brewer device 102, such as using a USB port on the brewer device 102. Upon plugging the connected USB drive 104 into the brewer device 102, the connected USB drive 104 may emulate a disk drive, such as a flash drive, to update the brewer. Although this disclosure will be discussed in terms of a USB connection between the connected USB drive 104 and the brewer device 102 for purposes of example, other physical and/or wireless interfaces could be used to transfer (or exchange) data between the connected USB drive 104 and the brewer device 102. For example, instead of a USB connection, the brewer update device could include wireless circuitry to establish a wireless connection (e.g., Bluetooth® connection) with one or more brewer devices and provide updates. The term "brewer device" is broadly intended to mean any device that could be used to produce a brewed beverage, such as coffee, tea, tisane, herbal teas, or other beverages.

The connected USB drive 104 may be embodied as any type of computation or computer device capable of performing the functions described herein. As shown in FIG. 1, the connected USB drive 104 illustratively includes a processor 110, an input/output subsystem 112, a memory 114, a user interface 116, a communication subsystem 118, a data storage device 120, a USB interface circuit 122, and a power source 124. Of course, the connected USB drive 104 may include other or additional components, such as those commonly found in a thumb drives or mobile computing devices, in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. The processor 110 may be embodied as a single or multi-core processor(s), microcontroller, or other processor or processing/controlling circuit.

The memory 114 may be embodied as any type of volatile or non-volatile memory or data storage capable of performing the functions described herein. In operation, the memory 114 may store various data and software used during operation of the connected USB drive 104 such as applications, programs, libraries, and/or drivers. The memory 114 is communicatively coupled to the processor 110 via the I/O subsystem 112, which may be embodied as circuitry and/or components to facilitate input/output operations with the processor 120, the memory 126, and other components of the connected USB drive 104. In some embodiments, the I/O subsystem 112 may form a portion of a system-on-a-chip (SoC) and be incorporated, along with the processor 110, the memory 114, and other components of the connected USB drive 104, on a single integrated circuit chip. Similarly, the data storage device 120 may be embodied as any type of device or devices configured for short-term or long-term storage of data such as, for example, memory devices and circuits, memory cards, hard disk drives, solid-state drives, non-volatile flash memory, or other data storage devices. In some embodiments, the data storage device 120 could be embodied as circuitry for accepting external data storage devices, such as a microSD card or other external data storage.

The connected USB drive 104 also includes the communication subsystem 118, which may be embodied as any communication circuit, device, or collection thereof, capable of enabling communications between the connected USB drive 104 and other remote devices over the network 108. The communication subsystem 118 may be configured to use any one or more communication technology (e.g., wired or wireless communications) and associated protocols (e.g., Ethernet, Wi-Fi®, WiMAX, 3G, 4G LTE, etc.) to effect such communication. In some embodiments, the communication subsystem 118 may form a portion of a SoC and be incorporated along with the processor 110 and other components of the connected USB drive 104 on a single integrated circuit chip.

The connected USB drive 104 may further include the user interface 116 to receive user input and/or provide status information concerning operations of the connected USB drive 104. In some embodiments, the connected USB drive 104 could include an input device, such as a button, switch, touchscreen, etc., from which the user could initiate certain operations or otherwise interact with the connected USB drive 104. For example, the connected USB drive 104 could include a power button or switch that could be used to initiate delivery of updates to the connected USB drive 104. In some embodiments, the connected USB drive 104 could include the same (e.g., with a long press) or another button to initiate emulating a disk drive. The user interface 116 could include an output device for updating the user regarding status of the connected USB drive 104, such as status LED lights, a speaker to output verbal status, beeps or other audible output, a screen or other visual, audio, and/or haptic output. For example, the connected USB drive 104 could include one or more LEDs with colors and/or flashing patterns that function as status indicators. By way of example only, a slow flash (or first color) could indicate update delivery is ongoing and a fast flash (or second color) could indicate that delivery is complete.

The connected USB drive 104 includes a power source 124 to supply electrical power to the electrical components of the connected USB drive 104. Depending on the circumstances, the connected USB drive 104 could be configured to be plugged into an A/C power outlet, an automotive power supply and/or include an internal battery that could be charged for supplying power to the connected USB drive 104.

The connected USB drive 104 may include a USB interface circuit 122 that is configured to communicate using the USB protocol. For example, the USB interface circuit 122 could be a USB controller in some embodiments. In some embodiments, the USB interface circuit 122 may form a portion of an SoC and be incorporated along with the processor 110 and other components of the connected USB drive 104 on a single integrated circuit chip. Depending on the circumstances, the connected USB drive 104 could include an integral USB connector, such as a USB-A, micro-USB, USB-C or other connector type for connecting with a USB port of the brewer device 102. In some embodiments, instead of an integral USB connector, the connected USB drive 104 could include a port for plugging in a USB cable that could be attached to the brewer device 102 for updates.

Figure 2:
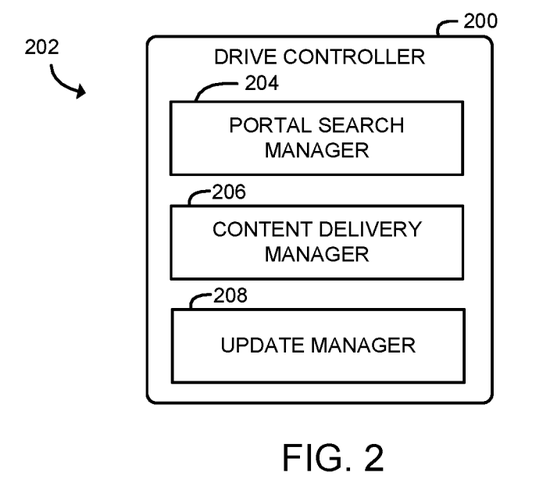
FIG. 2 is a simplified block diagram of various environments of a drive controller for the connected USB drive of FIG. 1.

Referring now to FIG. 2, in an illustrative embodiment, a drive controller 200 establishes an environment 202 during operation to control the connected USB drive 104. The illustrative environment 202 includes a portal search manager 204, a content delivery manager 206, and an update manager 208. As shown, the various components of the environment 202 may be embodied as hardware, firmware, software, or a combination thereof. As such, in some embodiments, one or more of the components of the environment 202 may be embodied as circuitry or collection of electrical devices (e.g., portal search circuitry, content delivery circuitry, and update circuitry). It should be appreciated that, in such embodiments, one or more of the portal search manager 204, a content delivery manager 206, and an update manager 208 may form a portion of the processor 110, the I/O subsystem 112, and/or other components of the connected USB drive 104. Additionally, in some embodiments, one or more of the illustrative components may form a portion of another component and/or one or more of the illustrative components may be independent of one another.

The portal search manager 204 is configured to establish a connection with a cloud account associated with the connected USB drive 104. For example, the connected USB drive 104 could be programmed to connect with a particular network location (and/or cycles between multiple network locations) and includes credentials for accessing a cloud account into which configuration changes/updates have been entered via the device management portal 106. Depending on the circumstances, the portal search manager 204 could be programmed to connect with more than one account. For example, consider a situation in which multiple accounts could be associated with a brewer device 102 depending on the type of update. The portal search manager could be configured to use the communications subsystem 118 to establish a cellular connection with the cloud account. In some embodiments, the portal search manager could connect with a Wi-Fi access point to access the network 108 and establish a connection with the cloud account.

The content delivery manager 206 is configured to determine whether any content updates are available for the cloud account associated with the connected USB drive 104 and initiate delivery to the connected USB drive 104. After the portal search manager 204 connects to the cloud account, the content delivery manager 206 searches the cloud account for any pending content updates. If there are no updates pending, the content delivery manager 206 could disconnect from the cloud account. If there are content updates, the content delivery manager 206 is configured to initiate delivery of the updates. Depending on the circumstances, the content delivery manager 206 could download the updates or the cloud account could push updates to the content delivery manager 206. Either way (e.g., whether the updates are pushed or pulled to the connected USB drive 104), the content delivery manager 206 stores the updates in the data storage 120.

The update manager 208 is configured to emulate a disk drive, such as a Flash drive, when the connected USB drive 104 is connected with the brewer device 102. In some embodiments, the update manager 208 is initiated through the user interface 116, such as by depressing a button or a switch on the connected USB drive 104. Typically, when the update manager 208 is emulating a disk drive, the brewer device 102 will treat the connected USB drive 104 like a conventional thumb drive for making updates.

Figure 3:
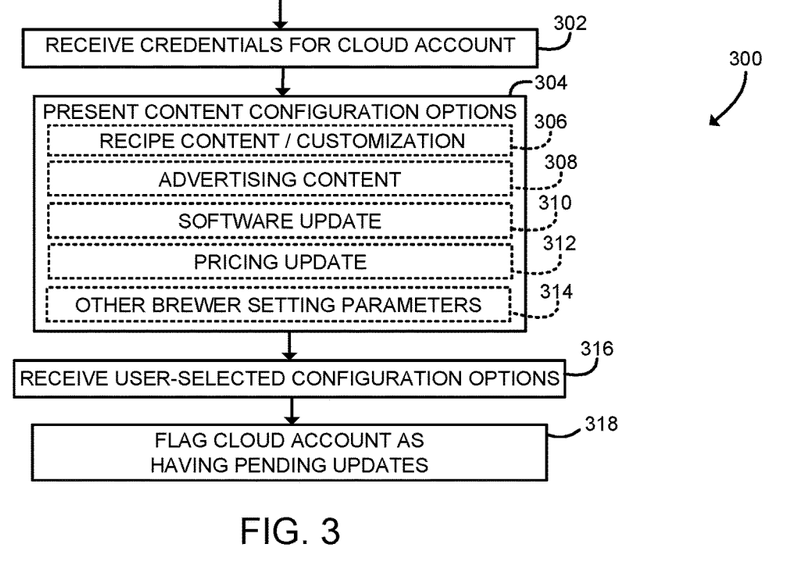
FIG. 3 is a simplified flow diagram of at least one embodiment of a method for selecting/customizing brewer configuration updates via the device management portal of FIG. 1.

Referring now to FIG. 3, in use, the device management portal 106 may execute a method 300 for selecting/configuring updates to one or more brewing devices. The method 300 begins in block 302, in which the device management portal 106 receives the user's credentials associated with his/her cloud account, such as a username and password, as the user logs. The device management portal 106 could be embodied in a variety of ways, such as using a web browser, a dedicated application on a computer, an app on a mobile device, etc. The method advances to block 304 in which the device management portal 106 presents an interface from which the user can select configuration options for one or more brewers associated with the cloud account. There are a wide variety of configuration parameters that could be presented by the device management portal 106, such as recipe content or customization (block 306), advertising content (block 308), software updates (block 310), pricing updates (block 312), or other parameters (block 314). These configuration parameters can be used to change and/or extend functionality of the brewer device 102. Once the user has configured all the updates/changes (block 316), the method advances to block 318 in which the cloud account is flagged as having pending updates for the associated brewing device(s). In some embodiments, the cloud account could be flagged with pending updates independent of the user entering updates/changes through the device management portal. For example, the cloud account could be flagged for a pending update if any associated brewing devices need a software patch or update.

Figure 4:
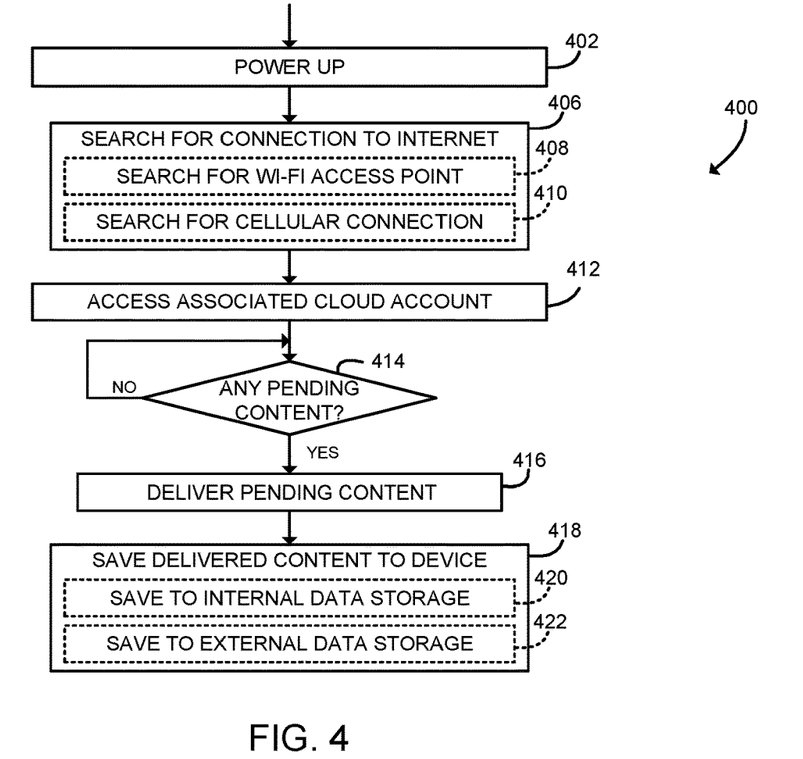
FIG. 4 is a simplified flow diagram of at least one embodiment of a method for delivering content to the connected USB drive of FIG. 1.

Referring now to FIG. 4, in use, the connected USB drive 104 may execute a method 400 for receiving content updates. It should be appreciated that, in some embodiments, the operations of the method 400 may be performed by one or more components of the environment 202 of the drive controller 200 as shown in FIG. 2. The method 400 begins in block 402, in which the connected USB drive 104 is powered up, such as by actuating a power switch. Upon being powered up, the method advances to block 404 in which the connected USB drive 104 searches for a way to wirelessly connect to the Internet. For example, the connected USB drive 104 could establish access with the Internet through a Wi-Fi access point (block 406) or through a cellular connection to the Internet (block 408). The connected USB drive 104 would use the connection to the Internet to access the associated cloud account (block 412). The method next advances to block 414 in which the connected USB drive 104 determines whether there is any pending content available for the brewing device(s) associated with the cloud account. If not, the connected USB drive 104 could continue waiting for pending updates or disconnect from the wireless Internet connection. If there are pending updates, the method advances to block 416 in which the content is delivered to the connected USB drive 104. As discussed above, the content could be pushed to the connected USB drive 104 or downloaded depending on the circumstances. Once the content has been delivered, the method advances to block 418 in which the content is saved to internal data storage (block 420) and/or external data storage (block 422).

Figure 5:
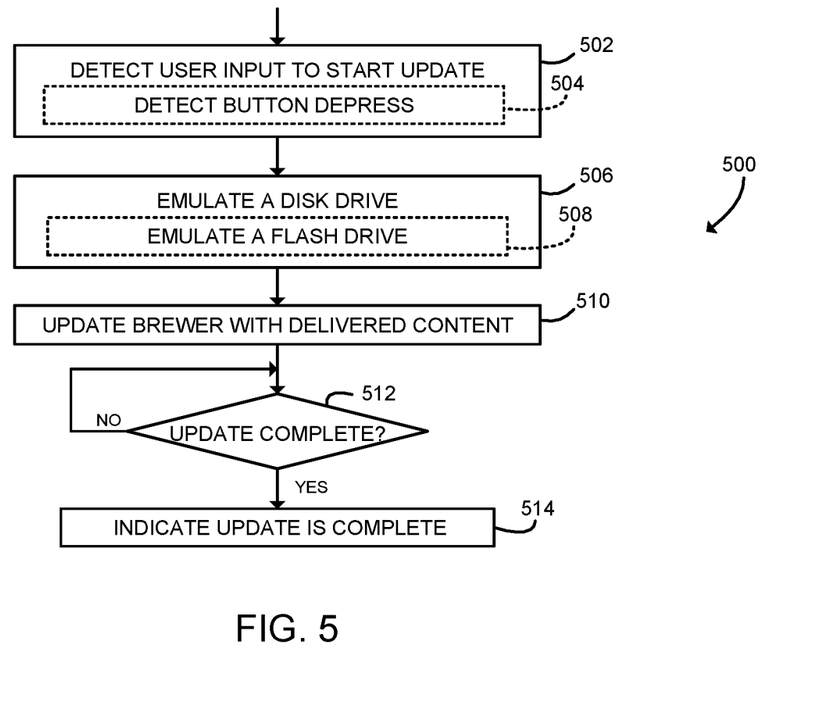
FIG. 5 is a simplified flow diagram of at least one embodiment of a method for updating a brewer device with the connected USB drive of FIG. 1.

Referring now to FIG. 5, in use, the connected USB drive 104 may execute a method 500 for emulating a disk drive to provide updates to the brewer device 102. It should be appreciated that, in some embodiments, the operations of the method 500 may be performed by one or more components of the environment 202 of the drive controller 200 as shown in FIG. 2. The method 500 begins in block 502, in which the connected USB drive 104 detects user input through the user interface 116 indicating an update to a brewer device 102 is being initiated. For example, the update could be initiated by detecting a button press on the connected USB drive 104 (block 504). The method advances to block 506 in which the connected USB drive 104 emulates a disk drive, which in some embodiments could be a Flash drive (block 508). Next, the connected USB drive 104 can transfer the update content to the brewer device 102 (block 510). The update continues until complete (block 512), and the connected USB drive 104 could then indicate that the update is complete (block 514), such as on the user interface 116.

It should be appreciated that, in some embodiments, the methods 400 and/or 500, may be embodied as various instructions stored on a computer-readable media, which may be executed by the processor 110, and/or other components of the connected USB drive 104 to cause the connected USB drive 104 to perform the respective method 400 and/or 500. The computer-readable media may be embodied as any type of media capable of being read by the connected USB drive 104 including, but not limited to, the memory 114, the data storage device 120, firmware devices, microcode, other memory or data storage devices of the connected USB drive 104, portable media readable by the connected USB drive 104, and/or other media.

Updating the brewer device 102 in the manner described herein with the connected USB drive 104 potentially offers multiple advantages. For example, a tech service person could drive over to the location where a software update is needed without worrying about the files and its format that needs to be prepared in a thumb drive. A tech service person with the connected USB drive 104 could have the update content pushed automatically to the device while driving over to the customer location. In situations where there is an immediate need for contents to be pushed while there is no access for a laptop nearby, the connected USB drive 104 acts as a completely secure and independent device, not needing a laptop to be in the vicinity. The connected USB drive 104 could also help sales associates and others always have the latest and greatest revision of all content that they need. The update content could be maintained on the connected USB drive 104 without any explicit action from them to download the latest revision every time and keeping up to date. The connected USB drive 104 could also aid end customers that own or lease the brewer device 102. These end customers could use the connected USB drive 104 as a tool for secure data transfers that manage and maintain a system that confirms delivery of critical information to a device owner and also establishes timestamps of when the content was pushed and when it was accessed for auditing purposes.

EXAMPLES

Illustrative examples of the technologies disclosed herein are provided below. An embodiment of the technologies may include any one or more, and any combination of, the examples described below.

Example 1 is a brewer update device for updating one or more configuration parameters of a brewer device. The brewer update device includes a portal search manager, a content delivery manager, and an update manager. The portal search manager is to establish a wireless connection with a cloud account associated with one or more pending updates for a brewer device. The content delivery manager is to wirelessly retrieve and store the one or more pending updates to a data storage device. The update manager is to emulate a disk drive and transfer the one or more pending updates to the brewer device.

Example 2 includes the subject matter of Example 1, and wherein: the brewer update device is a universal serial bus (USB) thumb drive.

Example 3 includes the subject matter of Examples 1-2, and wherein: to establish the wireless connection with the cloud account comprises (i) obtaining a predetermined network address stored on the brewer update device, wherein the predetermined network address is associated with the cloud account having one or more pending updates for a brewer device and (ii) connecting to the cloud account using the predetermined network address.

Example 4 includes the subject matter of Examples 1-3, and wherein: to establish the wireless connection with the cloud account further comprises (i) obtaining one or more credentials for accessing the cloud account stored on the brewer update device and (ii) accessing the cloud account based on the one or more credentials.

Example 5 includes the subject matter of Examples 1-4, and wherein: the portal search manager is to establish the wireless connection with the cloud account associated with one or more pending updates for the brewer device in response to power-up of the brewer update device.

Example 6 includes the subject matter of Examples 1-5, and wherein: the update manager is to initiate transfer of the one or more pending updates to the brewer device in response to selection of an input device of the brewer update device.

Example 7 includes the subject matter of Examples 1-6, and wherein: the input device is one or more of a button or switch.

Example 8 includes the subject matter of Examples 1-7, and wherein: the update manager is to transfer the one or more pending updates to the brewer device with wired or wireless communications of the brewer update device.

Example 9 includes the subject matter of Examples 1-8, and wherein: the update manager is further to, in response to completion of transfer of the one or more pending updates to the brewer device, indicate the transfer is complete on an output device.

Example 10 is a universal serial bus (USB) drive for changing one or more parameters of a brewer device. The USB drive comprises: a processor; a USB interface circuit coupled to the processor; a wireless communication circuit coupled to the processor; and a memory coupled to the processor and having stored therein a plurality of instructions that, when executed, cause the USB drive to: establish, using the wireless communication circuit, a wireless connection to a cloud account through which one or more configuration changes to a brewer device can be entered; search, using the wireless connection, for any pending updates associated with the cloud account; retrieve, using the wireless connection, one or more pending updates associated with the cloud account; store the one or more updates associated with the cloud account to the memory; emulate a disk drive in response to detecting initiation of an update process; and transfer, using the USB interface circuit, the one or more updates associated with the cloud account to a brewer device.

Example 11 includes the subject matter of Example 10, and wherein: to establish the wireless connection to the cloud account comprises connecting with a predetermined network address associated with the cloud account that is stored in the memory.

Example 12 includes the subject matter of Examples 10-11, and wherein: to establish the wireless connection to the cloud account includes retrieving one or more credentials for accessing the cloud account stored in the memory and connecting to the cloud account based on the one or more credentials.

Example 13 includes the subject matter of Examples 10-12, and wherein: the USB drive further includes an output device to update status of retrieving one or more pending updates.

Example 14 includes the subject matter of Examples 10-13, and wherein: the USB drive further includes an output device to update status of transferring the one or more pending updates to the brewer device.

Example 15 includes the subject matter of Examples 10-14, and wherein: the USB drive further includes one or more of an internal power source or a power port to receive an external power supply.

Example 16 includes the subject matter of Examples 10-15, and wherein: the USB drive further includes a USB connector coupled with the USB interface circuit to connect with a USB port of the brewing device.

Example 17 includes the subject matter of Examples 10-16, and wherein: the USB drive further includes an input device, and further comprising one or more instructions to initiate transfer of the one or more pending updates to the brewer device in response to selection of the input device.

Example 18 includes the subject matter of Examples 10-16, and wherein: the input device is one or more of a button or switch.

Example 19 includes the subject matter of Examples 10-17, and wherein: the USB drive includes one or more instructions to establish the wireless connection with the cloud account associated with one or more pending updates for the brewer device in response to power-up of the USB drive.

Example 20 is one or more non-transitory, computer-readable storage media comprising a plurality of instructions stored thereon that, in response to being executed, cause a computing device to: establish a wireless connection to a cloud account through which one or more configuration changes to a brewer device can be entered; search, using the wireless connection, for any pending updates associated with the cloud account; retrieve, using the wireless connection, one or more pending updates associated with the cloud account; store the one or more updates associated with the cloud account to a data storage device; emulate a disk drive in response to detecting initiation of an update process; and transfer the one or more updates associated with the cloud account to a brewer device.

Example 21 includes the subject matter of Example 20, and wherein: to establish the wireless connection to the cloud account comprises connecting with a predetermined network address associated with the cloud account.

Example 22 includes the subject matter of Examples 20-21, and wherein: to establish the wireless connection to the cloud account includes obtaining one or more credentials for accessing the cloud account from a local storage device.

Example 23 includes the subject matter of Examples 20-22, and further comprising: one or more instructions to update status of retrieving one or more pending updates on an output device.

Example 24 includes the subject matter of Examples 20-23, and further comprising: one or more instructions to update status of transferring the one or more pending updates to the brewer device on an output device.

Example 25 includes the subject matter of Examples 20-24, and further comprising: one or more instructions to initiate transfer of the one or more pending updates to the brewer device in response to selection of an input device.

Example 26 includes the subject matter of Examples 20-25, and further comprising: one or more instructions to establish the wireless connection with the cloud account associated with one or more pending updates for the brewer device in response to a power-up event.

Example 27 is a remote server to configure one or more parameters of a brewer device. The remote server comprising: a processor; and a memory coupled to the processor and having stored therein a plurality of instructions that, when executed, cause the remote server to: receive credentials for an account of a user; present one or more content configuration options for updating one or more parameters of one or more brewer devices associated with the account of the user; receive one or more user-selected configuration options for the one or more brewer devices associated with the associated of the user; store the one or more user-selected configuration options based on the account of the user; and flag the account of the user as having one or more pending updates.

Example 28 includes the subject matter of Example 27, and wherein: the one or more configuration options is one or more of: recipe content, advertising content, software update, pricing update.

Example 29 is a brewer update device for updating one or more configuration parameters of a brewer device. The brewer update device comprising: means for establishing a wireless connection with a cloud account associated with one or more pending updates for a brewer device; means for wirelessly retrieve and store the one or more pending updates to a data storage device; and means for emulating a disk drive and transfer the one or more pending updates to the brewer device.

The invention claimed is:

1. A universal serial bus (USB) drive for changing one or more parameters of a brewer device, the USB drive comprising:
 a processor;
 a USB interface circuit coupled to the processor;
 a wireless communication circuit coupled to the processor; and
 a memory coupled to the processor and having stored therein a plurality of instructions that, when executed, cause the USB drive to:
  establish, using the wireless communication circuit, a wireless connection to a cloud account through which one or more configuration changes to the brewer device can be entered;
  search, using the wireless connection, for any pending updates associated with the cloud account;
  retrieve, using the wireless connection, one or more pending updates associated with the cloud account;
  store the one or more updates associated with the cloud account to the memory;
  emulate a disk drive in response to detecting initiation of an update process; and
  transfer, using the USB interface circuit, the one or more updates associated with the cloud account to the brewer device.

2. The USB drive of claim 1, wherein to establish the wireless connection to the cloud account comprises connecting with a predetermined network address associated with the cloud account that is stored in the memory.

3. The USB drive of claim 1, wherein to establish the wireless connection to the cloud account includes retrieving one or more credentials for accessing the cloud account stored in the memory and connecting to the cloud account based on the one or more credentials.

4. The USB drive of claim 1, wherein the USB drive further includes an output device to update status of retrieving one or more pending updates.

5. The USB drive of claim 1, wherein the USB drive further includes an output device to update status of transferring the one or more pending updates to the brewer device.

6. The USB drive of claim 1, wherein the USB drive further includes one or more of an internal power source or a power port to receive an external power supply.

7. The USB drive of claim 1, wherein the USB drive further includes a USB connector coupled with the USB interface circuit to connect with a USB port of the brewing device.

8. The USB drive of claim 1, wherein the USB drive further includes an input device, and further comprising one or more instructions to initiate transfer of the one or more pending updates to the brewer device in response to selection of the input device.

9. The USB drive of claim 8, wherein the input device is one or more of a button or switch.

10. The USB drive of claim 1, wherein the USB drive includes one or more instructions to establish the wireless connection with the cloud account associated with one or more pending updates for the brewer device in response to power-up of the USB drive.

11. A universal serial bus (USB) drive for changing one or more parameters of a brewer device, the USB drive comprising:
 a processor;
 a USB interface circuit coupled to the processor;
 an output device coupled to the processor to present one or more status indicators regarding operation of the USB drive;
 a wireless communication circuit coupled to the processor; and
 a memory coupled to the processor and having stored therein a plurality of instructions that, when executed, cause the USB drive to:
  establish, using the wireless communication circuit, a wireless connection with a predetermined network address associated with a cloud account that is stored in memory;
  search, using the wireless connection, for any pending updates associated with the cloud account;
  retrieve, using the wireless connection, one or more pending updates associated with the cloud account;
  store the one or more updates associated with the cloud account to the memory;
  emulate a disk drive in response to detecting initiation of an update process; and
  transfer, using the USB interface circuit, the one or more updates associated with the cloud account to the brewer device.

12. The USB drive of claim 11, wherein to establish the wireless connection to the cloud account includes retrieving one or more credentials for accessing the cloud account stored in the memory and connecting to the cloud account based on the one or more credentials.

13. The USB drive of claim 11, wherein the output device presents a status indicator of retrieving one or more pending updates.

14. The USB drive of claim 11, wherein the output device presents a status indicator of transferring the one or more pending updates to the brewer device.

15. The USB drive of claim 11, wherein the USB drive further includes one or more of an internal power source or a power port to receive an external power supply.

16. The USB drive of claim 11, wherein the USB drive further includes a USB connector coupled with the USB interface circuit to connect with a USB port of the brewing device.

17. The USB drive of claim 11, wherein the USB drive further includes an input device, and further comprising one or more instructions to initiate transfer of the one or more pending updates to the brewer device in response to selection of the input device.

18. The USB drive of claim 17, wherein the input device is one or more of a button or switch.

19. The USB drive of claim 11, wherein the USB drive includes one or more instructions to establish the wireless connection with the cloud account associated with one or more pending updates for the brewer device in response to power-up of the USB drive.

20. The USB drive of claim 11, wherein the output device presents a status indicator indicating that transfer of the one or more updates associated with the cloud account to the brewer device is complete.

21. The USB drive of claim 11, wherein the one or more updates associated with the cloud account comprises one or more of: recipe content, advertising content, software update, or pricing update.

22. A system for changing one or more parameters of a brewer device, the system comprising:
   a remote server comprising:
      a processor; and
      a memory coupled to the processor and having stored therein a plurality of instructions that, when executed, cause the remote server to:
         receive credentials for an account of a user;
         present one or more content configuration options for updating one or more parameters of one or more brewer devices associated with the account of the user;
         receive one or more user-selected configuration options for the one or more brewer devices associated with the associated of the user;
         store the one or more user-selected configuration options based on the account of the user; and
         flag the account of the user as having one or more pending updates;
   a universal serial bus (USB) drive comprising:
      a processor;
      a USB interface circuit coupled to the processor;
      a wireless communication circuit coupled to the processor; and
      a memory coupled to the processor and having stored therein a plurality of instructions that, when executed, cause the USB drive to:
         establish, using the wireless communication circuit, a wireless connection to the account of the user;
         search, using the wireless connection, for one or more flags associated with the account of the user indicating one or more pending updates;
         retrieve, using the wireless connection, one or more pending updates associated with the account of the user;
         store the one or more updates associated with the account of the user to the memory;
         emulate a disk drive in response to detecting initiation of an update process; and
         transfer, using the USB interface circuit, the one or more updates associated with the account of the user to the brewer device.

23. The system of claim 22, wherein the one or more configuration options is one or more of: recipe content, advertising content, software update, or pricing update.

24. The system of claim 22, wherein the USB drive further includes a USB connector coupled with the USB interface circuit to connect with a USB port of the brewing device.

25. The system of claim 22, wherein the USB drive further includes an input device, and further comprising one or more instructions to initiate transfer of the one or more pending updates to the brewer device in response to selection of the input device.

26. The system of claim 25, wherein the input device is one or more of a button or switch.

* * * * *